US011554763B2

(12) United States Patent
Kaneta et al.

(10) Patent No.: US 11,554,763 B2
(45) Date of Patent: Jan. 17, 2023

(54) BRAKE DEVICE FOR SADDLE-TYPE VEHICLES

(71) Applicant: HONDA MOTOR CO., LTD., Tokyo (JP)

(72) Inventors: Hiroyuki Kaneta, Wako (JP); Chikashi Iizuka, Wako (JP); Chihiro Iida, Wako (JP); Hironori Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 280 days.

(21) Appl. No.: 16/764,130

(22) PCT Filed: Oct. 17, 2018

(86) PCT No.: PCT/JP2018/038700
§ 371 (c)(1),
(2) Date: May 14, 2020

(87) PCT Pub. No.: WO2019/130743
PCT Pub. Date: Jul. 4, 2019

(65) Prior Publication Data
US 2020/0276961 A1 Sep. 3, 2020

(30) Foreign Application Priority Data
Dec. 28, 2017 (JP) .............................. JP2017-254821

(51) Int. Cl.
B60T 8/32 (2006.01)
B60T 7/12 (2006.01)
(Continued)

(52) U.S. Cl.
CPC ............ B60T 8/3225 (2013.01); B60T 7/122 (2013.01); B60W 10/188 (2013.01); B60W 10/22 (2013.01); B62L 3/08 (2013.01)

(58) Field of Classification Search
None
See application file for complete search history.

(56) References Cited

U.S. PATENT DOCUMENTS
2017/0028971 A1 2/2017 Kajiyama et al.

FOREIGN PATENT DOCUMENTS
DE 41 15 747 A1 11/1992
DE 102011110977 A1 * 2/2013 ................ B60T 7/22
(Continued)

OTHER PUBLICATIONS
International Search Report, dated Jan. 22, 2019, 4 pages.
(Continued)

Primary Examiner — Melanie Torres Williams
(74) Attorney, Agent, or Firm — Rankin, Hill & Clark LLP

(57) ABSTRACT

In a brake device for a saddle-type vehicle, including hydraulic front and rear wheel brakes and a first control unit that controls operations of the front wheel brake and the rear wheel brake, a second control unit includes a collision possibility determining section that determines a possibility of collision of an own vehicle with an obstacle ahead, the first control unit has an automatic brake controller that performs automatic brake control to automatically increase braking forces of the front wheel brake and the rear wheel brake, and in case where the collision possibility determining section determines that there is the possibility of collision, the automatic brake controller pressurizes the rear wheel brake to brake a rear wheel, and simultaneously pressurizes the front wheel brake up to a predetermined pressure at which a vehicle body posture is not changed by braking of a front wheel.

14 Claims, 13 Drawing Sheets

(51) Int. Cl.
  *B60W 10/188* (2012.01)
  *B60W 10/22* (2006.01)
  *B62L 3/08* (2006.01)

(56) References Cited

FOREIGN PATENT DOCUMENTS

| | | |
|---|---|---|
| EP | 3124369 A2 | 2/2017 |
| JP | S61-271182 | 12/1986 |
| JP | 2004-268847 | 9/2004 |
| JP | 2017-024644 | 2/2017 |
| WO | 2013/088581 | 6/2013 |
| WO | 2017/041944 A1 | 3/2017 |
| WO | 2017/168692 A1 | 10/2017 |
| WO | WO-2018154399 A1 * | 8/2018 ............. B60K 28/14 |

OTHER PUBLICATIONS

Written Opinion of the International Searching Authority dated Jan. 22, 2019 filed in PCT/JP2018/038700, 4 pages.
European Search Report dated Jul. 16, 2020, 9 pages.
International Preliminary Report on Patentability dated Jul. 9, 2020, 8 pages.
Chinese Office Action dated Nov. 30, 2021, English translation included, 19 pages.
Chinese Office Action dated Nov. 28, 2021, English translation included, 19 pages.
Indian Office Action dated Jan. 27, 2021, 6 pages.

* cited by examiner

BRAKE DEVICE FOR SADDLE-TYPE VEHICLES

TECHNICAL FIELD

The present invention relates to a brake device for saddle-type vehicles.

BACKGROUND ART

Heretofore, a saddle-type vehicle comprising an automatic brake has been known (e.g., see Patent Literature 1).

CITATION LIST

Patent Literature

Patent Literature 1: International Publication No. WO2017/041944

SUMMARY OF INVENTION

Technical Problem

Note that, in a saddle-type vehicle, an operation of a brake easily affects a posture of an occupant, and hence it is desired that the operation of an automatic brake is hard to affect the posture of the occupant. It is simultaneously desired that the automatic brake rapidly decelerates the saddle-type vehicle.

An aspect of the present invention has been developed in view of the above described situation, and an object of the aspect is to provide a brake device for saddle-type vehicles so that an operation of an automatic brake is hard to affect a posture of an occupant and so that the automatic brake can rapidly decelerate the saddle-type vehicle.

Solution to Problem

All contents of Japanese Patent Application No. 2017-254821 filed on Dec. 28, 2017 are incorporated herein.

According to an aspect of the present invention, provided is a brake device for a saddle-type vehicle, comprising a front wheel brake (32) and a rear wheel brake (33) that are hydraulic, and a first control unit (31a) that controls operations of the front wheel brake (32) and the rear wheel brake (33), characterized in that a second control unit (31b) comprises a collision possibility determining section (53) that determines a possibility of collision of an own vehicle with an obstacle ahead, the first control unit (31a) comprises an automatic brake controller (55) that performs automatic brake control to automatically increase braking forces of the front wheel brake (32) and the rear wheel brake (33), and in case where the collision possibility determining section (53) determines that there is the possibility of collision, the automatic brake controller (55) pressurizes the rear wheel brake (33) to brake a rear wheel (3), and simultaneously pressurizes the front wheel brake (32) up to a predetermined pressure (P) at which a vehicle body posture is not changed by braking of a front wheel (2).

Furthermore, in the above aspect of the invention, the first control unit (31a) may comprise an antilock brake controller (56) that adjusts a pressure of the rear wheel brake (33) to avoid lock of the rear wheel (3), and the automatic brake controller (55) may pressurize the front wheel brake (32) at the predetermined pressure (P) to brake the front wheel (2), when an antilock operation by the antilock brake controller (55) is activated.

Additionally, in the above aspect of the invention, the automatic brake controller (55) operates at least one of the rear wheel brake (33) or the front wheel brake (32) so that a deceleration of the own vehicle reaches a target value (T), and the automatic brake controller (55) decreases the target value (T) in case where a bank angle of the own vehicle is larger than a predetermined bank angle (θ1).

Furthermore, in the above aspect of the invention, the saddle-type vehicle comprises a front suspension automatic adjustment mechanism (46) that adjusts a characteristic of a front suspension (21) for the front wheel (2), and in case where the collision possibility determining section (53) determines that there is the possibility of collision, the second control unit (31b) performs, via the front suspension automatic adjustment mechanism (46), at least one of control of increase of a damping force of the front suspension (21) in a compressing direction or control of increase of a spring reaction force of the front suspension (21).

Additionally, in the above aspect of the invention, the saddle-type vehicle comprises a rear suspension automatic adjustment mechanism (47) that adjusts a characteristic of a rear suspension (19) for the rear wheel (3), and in case where the collision possibility determining section (53) determines that there is the possibility of collision, the second control unit (31b) performs, via the rear suspension automatic adjustment mechanism (47), at least one of control of increase of a damping force of the rear suspension (19) in an elongation direction or control of decrease of a spring reaction force of the rear suspension (19).

Furthermore, the above aspect of the invention may comprise a road surface inclination angle detector (51) that detects an inclination of a road surface, the automatic brake controller (55) may brake the rear wheel brake (33) so that a deceleration of the own vehicle reaches the target value (T), and the automatic brake controller (55) may decrease the target value (T) in case where the road surface is a downward slope.

Additionally, in the above aspect of the invention, the automatic brake controller (55) may increase the target value (T) in case where the road surface is an upward slope.

Furthermore, in the above aspect of the invention, the first control unit (31a) and the second control unit (31b) may be provided separately.

Advantageous Effects of Invention

According to a brake device for a saddle-type vehicle of an aspect of the present invention, the brake device for the saddle-type vehicle comprises a front wheel brake and a rear wheel brake that are hydraulic, and a first control unit that controls operations of the front wheel brake and the rear wheel brake, a second control unit comprises a collision possibility determining section that determines a possibility of collision of an own vehicle with an obstacle ahead, the first control unit comprises an automatic brake controller that performs automatic brake control to automatically increase braking forces of the front wheel brake and the rear wheel brake, and in case where the collision possibility determining section determines that there is the possibility of collision, the automatic brake controller pressurizes the rear wheel brake to brake a rear wheel, and simultaneously pressurizes the front wheel brake up to a predetermined pressure at which a vehicle body posture is not changed by braking of a front wheel.

According to this configuration, the rear wheel is braked by the rear wheel brake, and the front wheel brake is pressurized up to the predetermined pressure at which the vehicle body posture is not changed by the braking of the front wheel, so that when the front wheel brake is further pressurized to brake the front wheel, a hydraulic pressure can be rapidly raised. Consequently, following the rear wheel, the front wheel can be rapidly braked, and the saddle-type vehicle can be rapidly decelerated by the automatic brake. Furthermore, since the rear wheel is braked prior to the front wheel, front-back pitching of the saddle-type vehicle can reduce, and the operation of the automatic brake is hard to affect an occupant's posture.

Furthermore, in the above aspect of the invention, the first control unit may comprise an antilock brake controller that adjusts a pressure of the rear wheel brake to avoid lock of the rear wheel, and the automatic brake controller may pressurize the front wheel brake at the predetermined pressure to brake the front wheel, when an antilock operation by the antilock brake controller is activated. According to this configuration, a braking force of the rear wheel can be utilized to a maximum degree, and hence the front-back pitching of the saddle-type vehicle can be effectively reduced.

Additionally, in the above aspect of the invention, the automatic brake controller may brake at least one of the rear wheel brake or the front wheel brake so that a deceleration of the own vehicle reaches a target value, and the automatic brake controller may decrease the target value in case where a bank angle of the own vehicle is more than or equal to a predetermined bank angle. According to this configuration, in case where the bank angle is more than or equal to the predetermined bank angle, the deceleration decreases, and hence the deceleration by the automatic brake during banking of the saddle-type vehicle can be more moderate than usual. Consequently, the operation of the automatic brake is hard to affect the occupant's posture.

Furthermore, in the above aspect of the invention, the saddle-type vehicle may comprise a front suspension automatic adjustment mechanism that adjusts a characteristic of a front suspension for the front wheel, and in case where the collision possibility determining section determines that there is the possibility of collision, the second control unit may perform, via the front suspension automatic adjustment mechanism, at least one of control of increase of a damping force of the front suspension in a compressing direction or control of increase of a spring reaction force of the front suspension. According to this configuration, by the increase of the damping force of the front suspension in the compressing direction and the increase of the spring reaction force, it is possible to reduce displacement of the front suspension in the compressing direction during the braking. Consequently, the front-back pitching of the saddle-type vehicle can reduce, and the operation of the automatic brake is hard to affect the occupant's posture.

Additionally, in the above aspect of the invention, the saddle-type vehicle may comprise a rear suspension automatic adjustment mechanism that adjusts a characteristic of a rear suspension for the rear wheel, and in case where the collision possibility determining section determines that there is the possibility of collision, the second control unit may perform, via the rear suspension automatic adjustment mechanism, at least one of control of increase of a damping force of the rear suspension in an elongation direction or control of decrease of a spring reaction force of the rear suspension. According to this configuration, by the increase of the damping force of the rear suspension in the elongation direction and the decrease of the spring reaction force, it is possible to reduce displacement of the rear suspension in the elongation direction during the braking. Consequently, the front-back pitching of the saddle-type vehicle can reduce, and the operation of the automatic brake is hard to affect the occupant's posture.

Furthermore, the above aspect of the invention may comprise a road surface inclination angle detector that detects an inclination of a road surface, the automatic brake controller may brake the rear wheel brake so that a deceleration of the own vehicle reaches the target value, and the automatic brake controller may decrease the target value in case where the road surface is a downward slope. According to this configuration, the deceleration decreases along the downward slope, and hence the operation of the automatic brake is hard to affect the occupant's posture even along the downward slope where the occupant is easily pulled forward by gravity.

Additionally, in the above aspect of the invention, the automatic brake controller may increase the target value in case where the road surface is an upward slope. The occupant is pulled rearward by gravity along the upward slope, and hence if the deceleration increases, change in forward posture of the occupant can decrease. Consequently, the saddle-type vehicle can be rapidly decelerated, while suppressing the change in the occupant's posture.

Furthermore, in the above aspect of the invention, the first control unit and the second control unit may be provided separately. According to this configuration, the first control unit and the second control unit can be arranged individually, and a degree of freedom in arrangement is high.

DESCRIPTION OF EMBODIMENTS

Hereinafter, description will be made as to embodiments of the present invention with reference to the drawings. Note that in the description, front and back, left and right and up and down directions are the same as in those to a vehicle body unless otherwise described. Furthermore, reference sign FR shown in each drawing indicates a vehicle body front, reference sign UP indicates a vehicle body up, and reference sign LH indicates a vehicle body left hand.

First Embodiment

Figure 1:
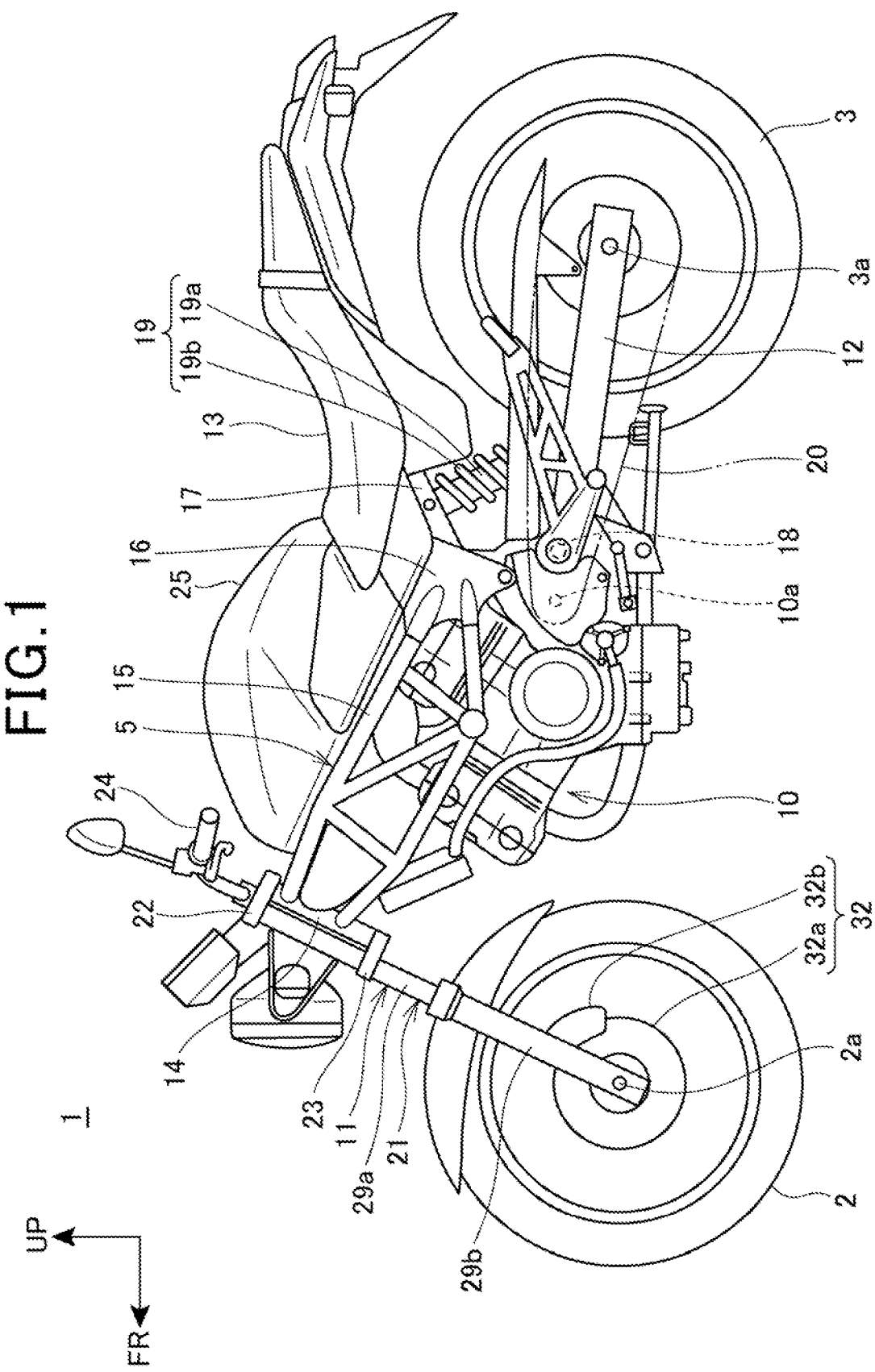
FIG. 1 is a left side view of a motorcycle according to a first embodiment of the present invention.

FIG. 1 is a left side view of a motorcycle according to a first embodiment of the present invention.

A motorcycle 1 is a vehicle in which an engine 10 is supported as a power unit on a vehicle body frame 5, a steering system 11 steerably supporting a front wheel 2 is steerably supported on a front end of the vehicle body frame 5, and a swing arm 12 supporting a rear wheel 3 is provided on a rear side of the vehicle body frame 5. The motorcycle 1 is a saddle-type vehicle in which a seat 13 straddled and seated by an occupant is provided above a rear part of the vehicle body frame 5.

The vehicle body frame 5 comprises a head pipe 14, a main frame 15 extending downward and rearward from the head pipe 14, a plate-like center frame 16 provided at a rear end of the main frame 15, and a seat frame 17 extending upward and rearward from the center frame 16 to a vehicle rear part.

A pivot shaft 18 supporting the swing arm 12 is provided in a rear part of the engine 10. The swing arm 12 has a front end supported about the pivot shaft 18, and is swingable in an up-down direction about the pivot shaft 18. The rear wheel 3 is supported on an axle 3a of a rear end portion of the swing arm 12.

Note that the pivot shaft 18 just needs to be supported in the vehicle body formed by the engine 10, the vehicle body frame 5 and others, and may be provided in the vehicle body frame 5.

The swing arm 12 is coupled to the vehicle body via a rear suspension 19 provided between the swing arm 12 and the vehicle body frame 5 in a bridging manner.

An output of the engine 10 is transmitted to the rear wheel 3 via a drive chain 20 provided between an output shaft 10a of the engine 10 and the rear wheel 3 in the bridging manner.

The steering system 11 comprises a steering shaft (not shown) supported rotatably about the head pipe 14, a pair of right and left front forks 21 (a front suspension) arranged on opposite right and left sides of the front wheel 2, a top bridge 22 fixed to an upper end of the steering shaft to couple upper portions of the right and left front forks 21, a bottom bridge 23 fixed to a lower end of the steering shaft to couple the right and left front forks 21, and a handle 24 fixed to an upper portion of the top bridge 22.

The front wheel 2 is supported about an axle 2a of lower end portions of the right and left front forks 21.

The pair of right and left front forks 21 shown in FIG. 1 form a telescopic suspension that makes a stroke in an axial direction.

Each of the front forks 21 comprises a fixed tube 29a fixed to the top bridge 22 and the bottom bridge 23, a movable tube 29b that makes a stroke in the axial direction to the fixed tube 29a, a fork spring (not shown) provided in these tubes and compressed in a stroke direction of the front fork 21, hydraulic oil, and a front side damping force adjusting section (not shown) that can adjust a damping force in the stroke of the front fork 21.

A fuel tank 25 is provided between the head pipe 14 and the seat 13.

Figure 2:
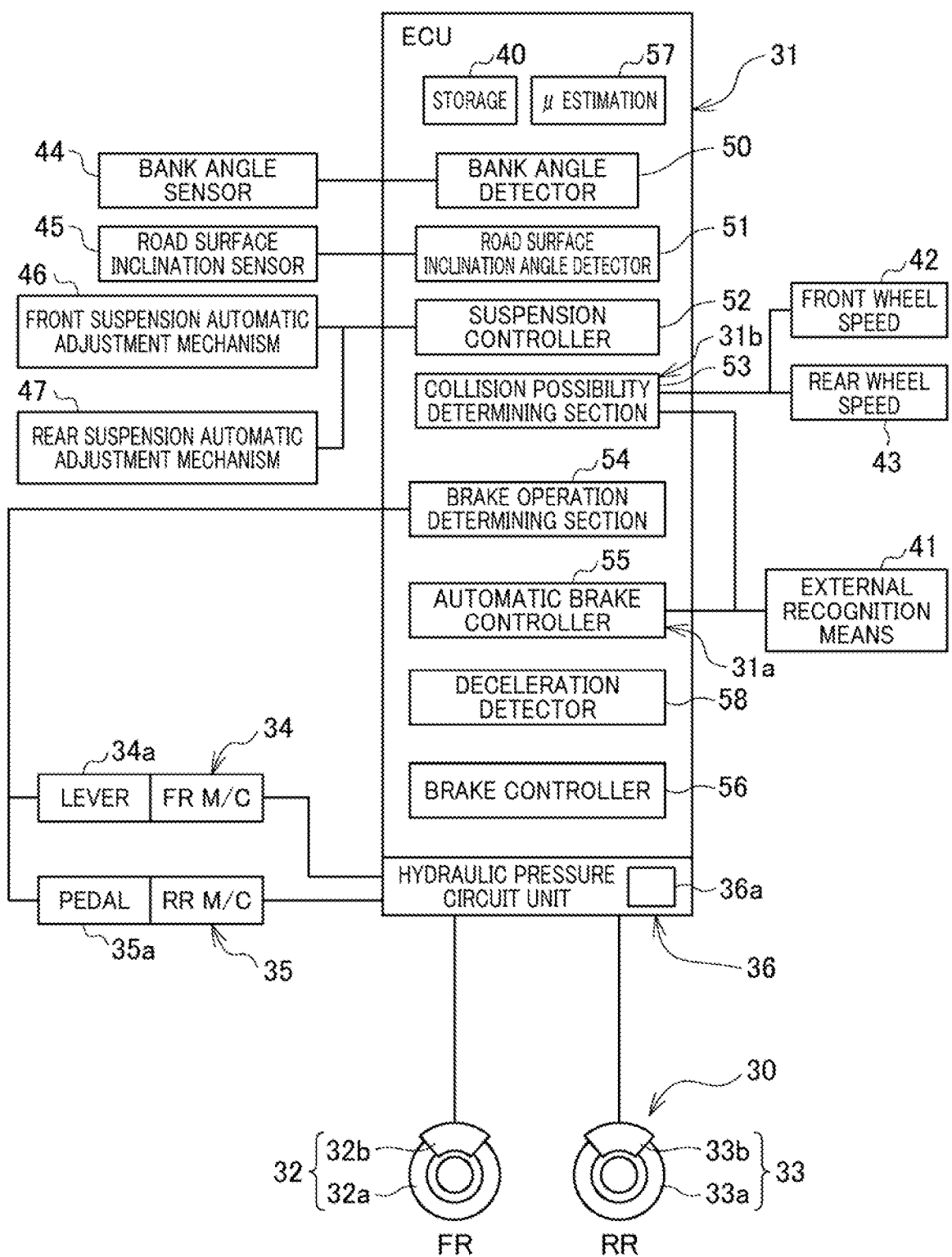
FIG. 2 is a block diagram of a brake device.

FIG. 2 is a block diagram of a brake device.

The brake device comprises a brake mechanism 30 that brakes the front wheel 2 and the rear wheel 3 with a hydraulic pressure (an oil pressure), and a control unit 31 that controls the brake mechanism 30.

The brake mechanism 30 comprises a front wheel brake 32, a rear wheel brake 33, a front master cylinder 34 for the front wheel brake 32, a rear master cylinder 35 for the rear wheel brake 33, and a hydraulic pressure circuit unit 36 that supplies the hydraulic pressure of each of the front wheel brake 32 and the rear wheel brake 33.

The front wheel brake 32 comprises a front brake disk 32a fixed to the front wheel 2, and a caliper 32b that pinches the front brake disk 32a with the hydraulic pressure to brake the front wheel 2.

The rear wheel brake 33 comprises a rear brake disk 33a fixed to the front wheel 2, and a caliper 33b that pinches the rear brake disk 33a with the hydraulic pressure to brake the rear wheel 3.

A front brake operation element 34a such as a brake lever is provided in the front master cylinder 34, and the front master cylinder 34 generates the hydraulic pressure in response to an operation of the front brake operation element 34a.

A rear brake operation element 35a such as a brake pedal is provided in the rear master cylinder 35, and the rear master cylinder 35 generates the hydraulic pressure in response to an operation of the rear brake operation element 35a.

The front master cylinder 34 is connected to the front wheel brake 32 via the hydraulic pressure circuit unit 36. The rear master cylinder 35 is connected to the rear wheel brake 33 via the hydraulic pressure circuit unit 36.

The brake device is a brake system that controls each of the front wheel brake 32 and the rear wheel brake 33 with an electric signal to pressurize and decompress the brakes.

The hydraulic pressure circuit unit 36 comprises a hydraulic pressure generation means 36a such as an electric pump to be controlled by the control unit 31, and can switch a hydraulic pressure route.

The control unit 31 can control the hydraulic pressure to be output from the hydraulic pressure circuit unit 36 to each of the front wheel brake 32 and the rear wheel brake 33 in accordance with the hydraulic pressure input from each of the front master cylinder 34 and the rear master cylinder 35 into the hydraulic pressure circuit unit 36.

The control unit 31 performs automatic brake control based on various pieces of information including vehicle information and external information, separately from the operations of the front brake operation element 34a and the rear brake operation element 35a by the occupant, to generate a braking force onto each of the front wheel brake 32 and the rear wheel brake 33.

The control unit 31 is an electronic control unit (ECU).

The control unit 31 comprises a computing unit (not shown) and a storage 40. The computing unit is a processor such as a CPU. The control unit 31 executes program stored in the storage 40, to perform antilock braking system control (ABS control), the automatic brake control and the like. The storage 40 is a nonvolatile memory, such as a flash ROM and an EEPROM, and stores the program to be executed by the computing unit, data to be processed by the computing unit and the like.

Detected information of operation amounts of the front brake operation element 34a and the rear brake operation element 35a are input into the control unit 31.

Furthermore, the control unit 31 is connected to an external recognition means 41, a wheel speed sensor 42 of the front wheel 2, a wheel speed sensor 43 of the rear wheel 3, the hydraulic pressure circuit unit 36, a bank angle sensor 44, a road surface inclination sensor 45, a front suspension automatic adjustment mechanism 46, and a rear suspension automatic adjustment mechanism 47.

The control unit 31 acquires rotation of the front wheel 2 from the wheel speed sensor 42, and acquires rotation of the rear wheel 3 from the wheel speed sensor 43. The control unit 31 calculates a vehicle speed of the motorcycle 1 from detected values of the wheel speed sensor 42 and the wheel speed sensor 43.

The external recognition means 41 comprises, for example, radar equipment installed in an end part of the motorcycle 1. The radar equipment emits electromagnetic waves such as millimeter waves toward a front of the vehicle at a predetermined control period, and receives the reflected waves. The control unit 31 determines whether there is an obstacle (including another vehicle) in front of the vehicle, based on a transmission/reception state of the millimeter waves in the radar equipment and, if there is the obstacle, calculates a distance between this obstacle and the own vehicle and relative speeds. Hereinafter, the obstacle will be referred to as an obstacle ahead.

Note that the external recognition means 41 may be configured to use a camera in addition to the radar equipment, and to utilize any combination of transmitted/received information of the radar equipment with imaging information of the camera.

Various types of functional units that the control unit 31 has are formed by cooperation of software and hardware when the above computing unit executes the program.

The control unit 31 executes each processing and controls the brake device by use of data stored in the storage 40.

The control unit 31 includes functions of a bank angle detector 50, a road surface inclination angle detector 51, a suspension controller 52, a collision possibility determining section 53, a brake operation determining section 54, an automatic brake controller 55, a brake controller 56 (an antilock brake controller), a friction coefficient estimation section 57, and a deceleration detector 58.

The control unit 31 comprises a first control unit 31a that controls the brake device, and a second control unit 31b that controls the engine 10 and respective parts of the vehicle body.

The brake operation determining section 54, the automatic brake controller 55, the brake controller 56 (the antilock brake controller) and the friction coefficient estimation section 57 are provided in the first control unit 31a.

The bank angle detector 50, the road surface inclination angle detector 51, the suspension controller 52, the collision possibility determining section 53 and the deceleration detector 58 are provided in the second control unit 31b.

Note that in the present embodiment, the first control unit 31a and the second control unit 31b are integrally provided, but the first control unit 31a and the second control unit 31b may be separately provided.

The bank angle detector 50 acquires a detected value of the bank angle sensor 44, and calculates a bank angle of the motorcycle 1 based on this detected value. Here, the bank angle is an inclination angle from an upright state of the motorcycle 1 in a right-left direction.

The road surface inclination angle detector 51 acquires a detected value of the road surface inclination sensor 45, and calculates, based on this detected value, an inclination angle of a road surface where the motorcycle 1 travels. Here, the inclination angle of the road surface is an inclination angle of the motorcycle 1 in a travel direction (a front-back direction), and is an angle relative to a horizontal plane.

The suspension controller 52 controls the front suspension automatic adjustment mechanism 46 and the rear suspension automatic adjustment mechanism 47 based on information including the vehicle speed of the motorcycle 1, and adjusts operating characteristics of the rear suspension 19 and the front forks 21.

The collision possibility determining section 53 determines a possibility of collision of the motorcycle 1 with the obstacle ahead based on detected information of the external recognition means 41 and the wheel speed sensors 42, 43.

The brake operation determining section 54 determines situations indicating whether there is a brake operation by the occupant of the motorcycle 1 and including an operation amount of the brake operation.

The automatic brake controller 55 performs control to automatically increase the braking forces of the front wheel brake 32 and the rear wheel brake 33 in case where the collision possibility determining section 53 determines that there is the possibility of collision.

The brake controller 56 executes usual brake control to operate the front wheel brake 32 and the rear wheel brake 33 in response to inputs from the front brake operation element 34a and the rear brake operation element 35a, and also executes antilock brake control to avoid lock of each of the front wheel 2 and the rear wheel 3 by the front wheel brake 32 and the rear wheel brake 33. Here, the lock means that the rotation of the front wheel 2 or the rear wheel 3 stops during travel through the braking by the front wheel brake 32 and the rear wheel brake 33. In the antilock brake control, the brake controller 56 decreases the hydraulic pressures of the front wheel brake 32 and the rear wheel brake 33 that are likely to lock, to avoid the lock.

The friction coefficient estimation section 57 performs processing of estimating a friction coefficient of the road surface. The friction coefficient estimation section 57 calculates the friction coefficient of the road surface in accordance with a difference in wheel speed between the front wheel 2 and the rear wheel 3 based on detection results of the wheel speed sensors 42, 43. In the above difference in wheel speed, for example, the difference in wheel speed between the rear wheel 3 as a drive wheel and the front wheel 2 as a driven wheel is used.

The deceleration detector 58 detects deceleration of the motorcycle 1 based on the detection results of the wheel speed sensors 42, 43.

Figure 3:
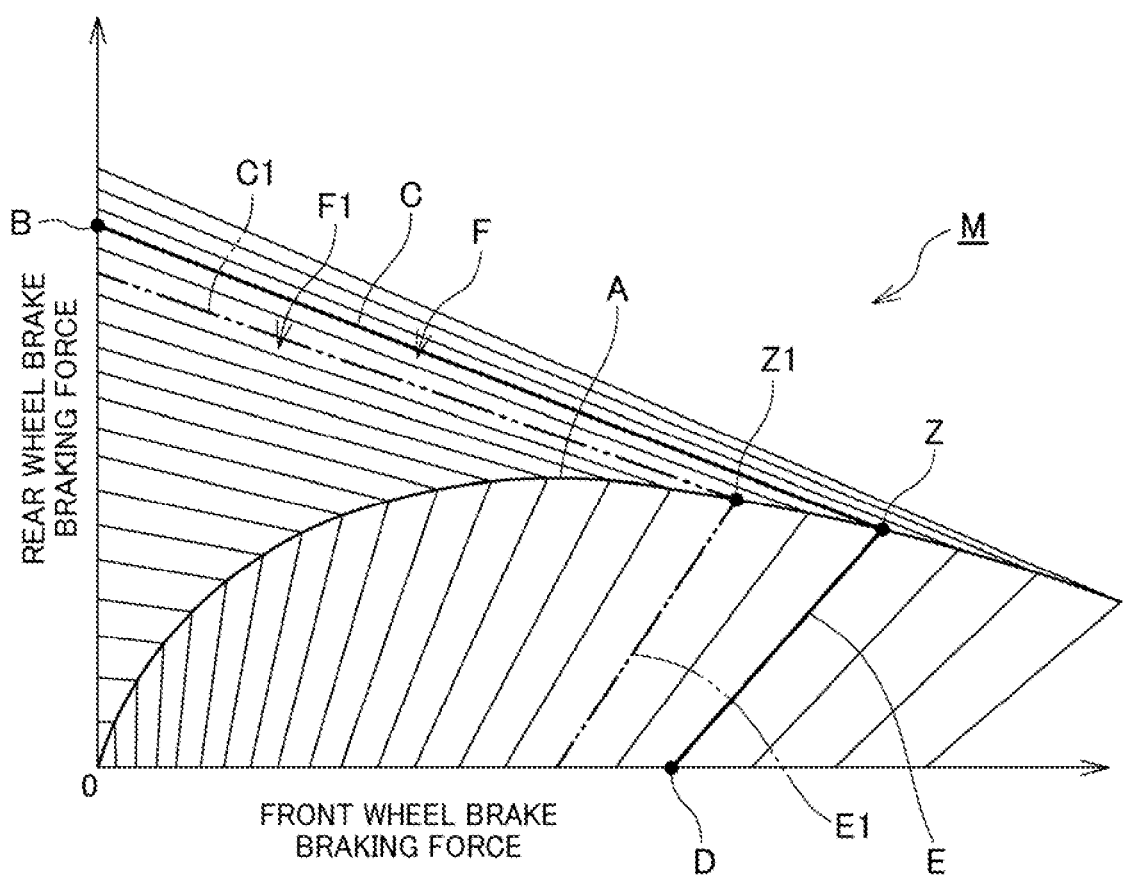
FIG. 3 is a diagram showing a braking force map of a front wheel brake and a rear wheel brake.

FIG. 3 is a diagram showing a braking force map M of the front wheel brake 32 and the rear wheel brake 33.

The braking force map M is stored in the storage 40. In the braking force map M, a vertical axis (one axis) indicates the braking force of the rear wheel brake 33, and a horizontal axis (the other axis) indicates the braking force of the front wheel brake 32.

The braking force map M shows an ideal growth curve A of each of the front wheel brake 32 and the rear wheel brake 33. In the ideal growth curve A, a point Z in a right part of the drawing is a front-back braking limit point at which a maximum deceleration is generated in the motorcycle 1 by combination of the front wheel brake 32 and the rear wheel brake 33, in case where the friction coefficient of the road surface has a certain value (e.g., 0.85). If the braking force increases to the front-back braking limit point Z or more, at least one of the front wheel 2 or the rear wheel 3 locks. The front-back braking limit point Z is a lock limit point of each of the front wheel 2 and the rear wheel 3.

A point B on the vertical axis is a rear wheel braking limit point in only operating the rear wheel brake 33. If the braking force of the rear wheel 3 increases to the rear wheel braking limit point B or more, the rear wheel 3 locks. The rear wheel braking limit point B is a lock limit point of the rear wheel 3.

Furthermore, a rear wheel brake boundary C linearly extending from the rear wheel braking limit point B to the front-back braking limit point Z indicates a braking force of the rear wheel brake 33 at lock limit.

A point D on the horizontal axis is a front wheel braking limit point in only operating the front wheel brake 32, and if the braking force of the front wheel 2 increases to the front wheel braking limit point D or more, the front wheel 2 locks. The front wheel braking limit point D is the lock limit point of the front wheel 2.

Furthermore, a front wheel brake boundary E linearly extending from the front wheel braking limit point D to the front-back braking limit point Z indicates the braking force of the front wheel brake 32 at the lock limit.

In the braking force map M, an unlock region F defined by the vertical axis, the horizontal axis, the rear wheel brake boundary C, and the front wheel brake boundary E is a region where the lock of each of the front wheel brake 32 and the rear wheel brake 33 is avoidable.

Figure 4:
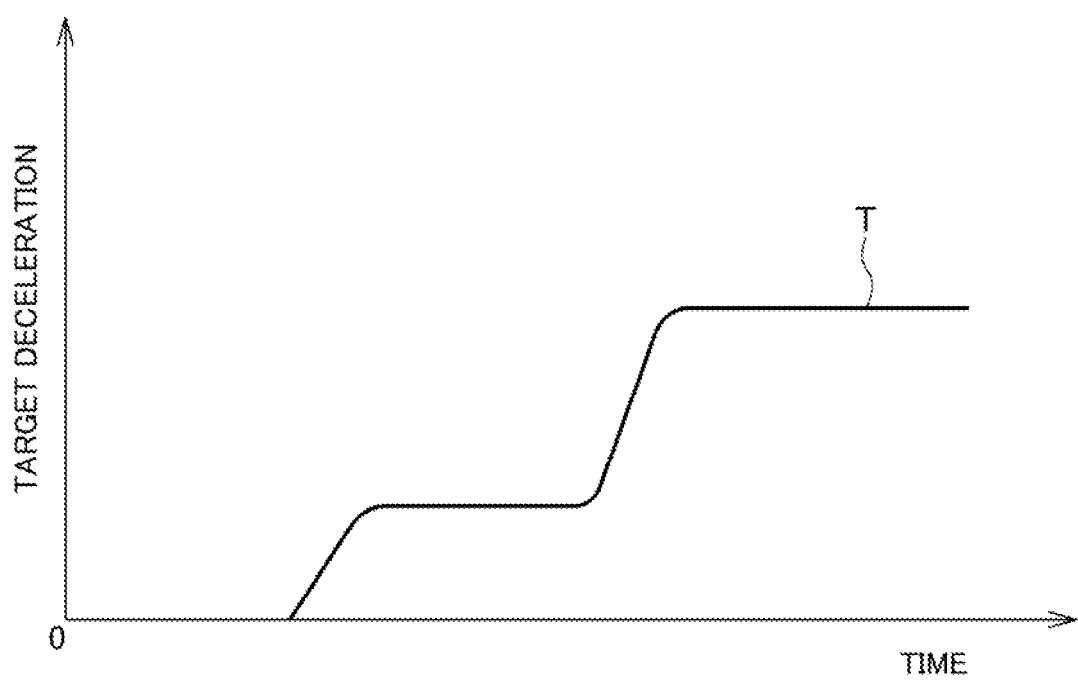
FIG. 4 is a graph showing a target deceleration of automatic brake control.

FIG. 4 is a graph showing a map of a target deceleration T of the automatic brake control.

The target deceleration T is a target value of deceleration of the motorcycle 1 in performing the automatic brake control. The map of the target deceleration T is stored in the storage 40.

The automatic brake controller 55 drives the front wheel brake 32 and the rear wheel brake 33 so that the deceleration of the motorcycle 1 reaches the target deceleration T.

A pattern of the target deceleration T changes from braking start of the automatic brake control in a stepwise manner with elapse of time, and a pattern of a latter half of the automatic brake control is set to be larger than a pattern of a front half thereof.

The target deceleration T changes in accordance with the friction coefficient of the road surface that is obtained from the friction coefficient estimation section 57. In case where the friction coefficient of the road surface is small, the target deceleration T is set to be small.

With reference to FIG. 3, the rear wheel brake boundary C and the front wheel brake boundary E change in accordance with the friction coefficient of the road surface that is obtained from the friction coefficient estimation section 57.

For example, in case where the friction coefficient of the road surface is small, an unlock region F1 defined by the vertical axis, the horizontal axis, a rear wheel brake boundary C1 and a front wheel brake boundary E1 is smaller than the unlock region F. Consequently, limit braking of the front wheel brake 32 and the rear wheel brake 33 can be performed in accordance with the friction coefficient of the road surface.

The rear wheel brake boundary C1 and the front wheel brake boundary E1 intersect at a front-back braking limit point Z1 that is an intersection on the ideal growth curve A. The front-back braking limit point Z1 corresponds to an upper-limit braking force in the unlock region F1.

In the automatic brake control performed by the control unit 31, when it is determined that there is the possibility of collision, the rear wheel brake 33 is pressurized to brake the rear wheel 3, and the front wheel brake 32 is simultaneously pressurized up to a predetermined pressure P (FIG. 6) at which a vehicle body posture is not changed by braking of the front wheel 2.

The automatic brake control will be described with reference to FIG. 2, FIG. 3, and FIG. 5 to FIG. 7.

Figure 5:
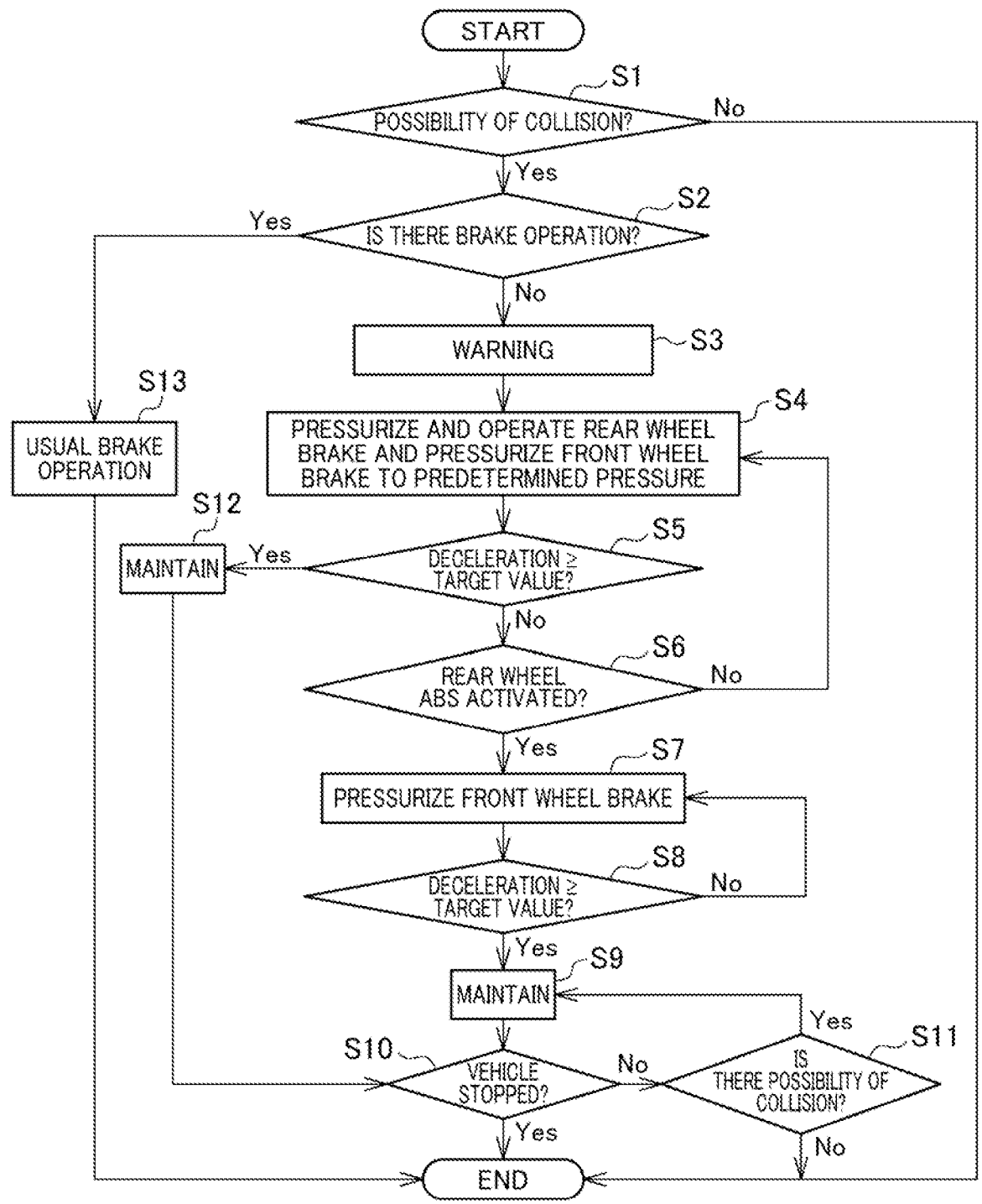
FIG. 5 is a flowchart showing processing of the automatic brake control.
Figure 6:
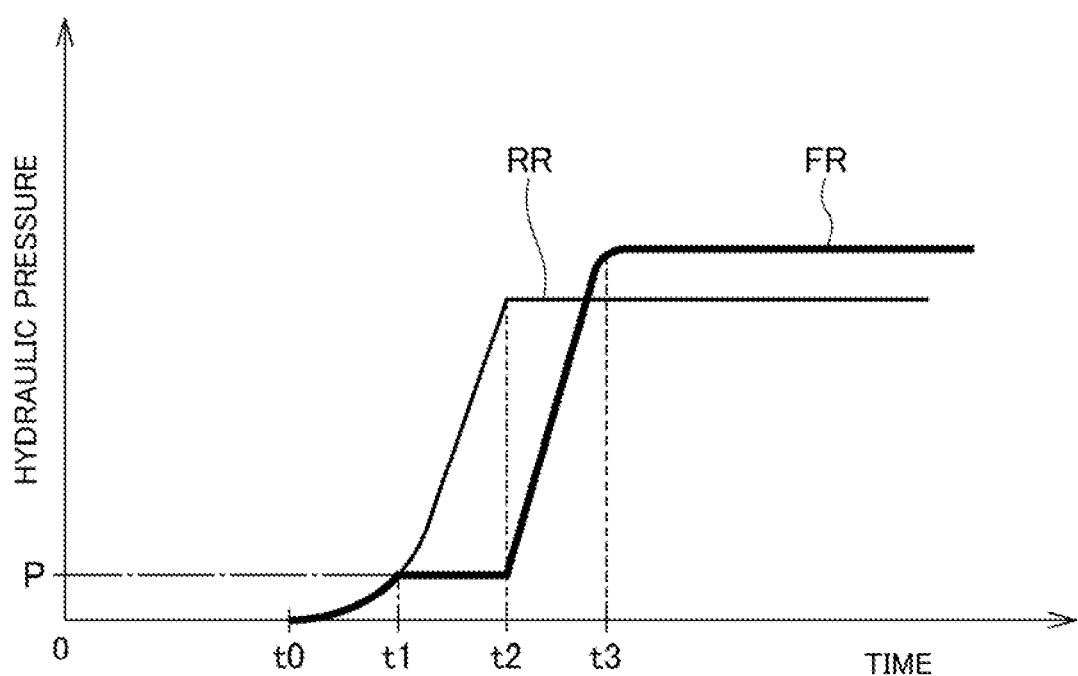
FIG. 6 is a graph showing a change in hydraulic pressure of each of the front wheel brake and the rear wheel brake in the automatic brake control.
Figure 7:
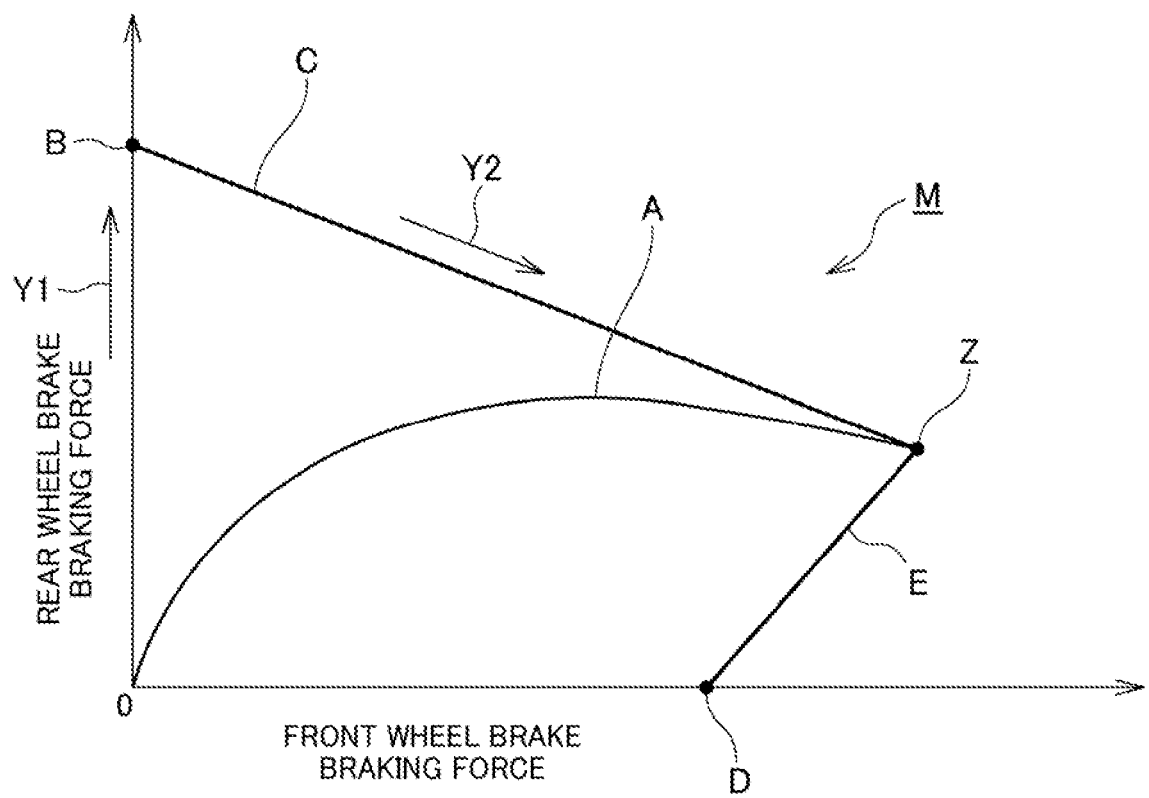
FIG. 7 is a graph showing a change in braking force in the automatic brake control.

FIG. 5 is a flowchart showing processing of the automatic brake control. FIG. 6 is a graph showing a change in hydraulic pressure of each of the front wheel brake 32 and the rear wheel brake 33 in the automatic brake control. FIG. 7 is a graph showing a change in braking force in the automatic brake control. Processing of FIG. 5 is repeatedly executed in a predetermined control period. In FIG. 6, the hydraulic pressure of the front wheel brake 32 is denoted with reference sign FR, and the hydraulic pressure of the rear wheel brake 33 is denoted with reference sign RR.

First, in the control unit 31, the collision possibility determining section 53 detects whether there is the possibility of collision of the motorcycle 1 (the own vehicle) with the obstacle ahead (step S1). In detail, the collision possibility determining section 53 calculates the vehicle speed of the motorcycle 1 based on the detected values of the wheel speed sensors 42, 43, and obtains information on the obstacle ahead, the distance between the obstacle ahead and the motorcycle 1, and the relative speeds based on a detected value of the external recognition means 41.

The collision possibility determining section 53 determines the possibility of collision with the obstacle ahead in case where, for example, the braking force of the upper limit of the unlock region F1 of the braking force map M (the front-back braking limit point Z1) acts on the motorcycle 1 having the calculated vehicle speed (the step S1).

If there is no possibility of collision (the step S1: No), the control unit 31 ends the processing of the automatic brake control.

If there is the possibility of collision (the step S1: Yes), the control unit 31 determines whether there is the brake operation by the occupant based on a detection result of the brake operation determining section 54 (step S2).

If there are not any brake operations (the step S2: No), the control unit 31 gives a warning to the occupant (step S3). Examples of this warning include warning display to a meter, the warning by sound, and vibration given to the handle.

After the warning, the automatic brake controller 55 pressurizes the rear wheel brake 33 to brake the rear wheel 3, and simultaneously pressurizes the front wheel brake 32 up to the predetermined pressure P at which the vehicle body posture of the motorcycle 1 is not changed by the braking of the front wheel 2 (step S4).

In detail, play is set to each part of the brake mechanism 30 that includes a space between the front brake disk 32a and the caliper 32b, and in a state where the rear wheel brake 33 is not pressurized, there is a gap between a braking surface of the caliper 32b and the front brake disk 32a. In the step S4, the front wheel brake 32 is pressurized up to the predetermined pressure P at which the braking surface of the caliper 32b is in slight contact with the front brake disk 32a and so-called brake drag occurs. The predetermined pressure P is a limit value of the hydraulic pressure at which the vehicle body posture of the motorcycle 1 is not changed by the braking of the front wheel 2. When the braking by the front wheel brake 32 starts, load movement of the motorcycle 1 makes a stroke of each of the front forks 21 in a compressing direction to change the vehicle body posture, but the pressurizing of the front wheel brake 32 up to the predetermined pressure P does not make any strokes of the front fork 21 in the compressing direction. That is, up to the predetermined pressure P, the braking of the front wheel brake 32 does not cause pitching of the vehicle body in a direction in which the front of the motorcycle 1 sinks downward.

If the hydraulic pressure is in excess of the predetermined pressure P as described later, the caliper 32b pinches the front brake disk 32a, and braking of the front wheel 2 substantially starts.

Note that the predetermined pressure P may be a hydraulic pressure just before the braking surface of the caliper 32b comes in contact with the front brake disk 32a and at which the braking of the front wheel 2 does not start. In this case, if the pressure is in excess of the predetermined pressure P, the braking of the front wheel 2 substantially starts.

That is, as shown in FIG. 6, in the step S4, the rear wheel brake 33 and the front wheel brake 32 simultaneously start to be pressurized at time t0, and the hydraulic pressure of the front wheel brake 32 reaches the predetermined pressure P at time t1. Thereafter, the hydraulic pressure of the front wheel brake 32 is maintained at the predetermined pressure P, and the hydraulic pressure of the rear wheel brake 33 also rises at and after the time t1.

With reference to FIG. 7, in the step S4, the braking force of the rear wheel brake 33 increases along a vertical axis as shown by arrow Y1 in FIG. 7. In the step S4, the hydraulic pressure of the front wheel brake 32 increases to the predetermined pressure P (FIG. 6), but almost no braking force of the front wheel brake 32 is generated.

Next, with reference to FIG. 5, the automatic brake controller 55 determines whether the braking only of the rear wheel brake 33 causes the deceleration of the motorcycle 1 to reach the target deceleration T (FIG. 4) based on the deceleration detector 58 (step S5).

If the deceleration does not reach the target deceleration T (the step S5: No), the automatic brake controller 55 determines whether the antilock brake control of the rear wheel brake 33 is activated (step S6).

If the antilock brake control of the rear wheel brake 33 is not activated (the step S6: No), processing returns to the step S4 where the automatic brake controller 55 further pressurizes the rear wheel brake 33 and maintains the hydraulic pressure of the front wheel brake 32 at the predetermined pressure P.

If the antilock brake control of the rear wheel brake 33 is activated (the step S6: Yes), the automatic brake controller 55 further pressurizes the front wheel brake 32 at the predetermined pressure P, and starts the braking of the front wheel 2 by the front wheel brake 32 (step S7). That is, the automatic brake controller 55 pressurizes the rear wheel brake 33 until the antilock brake control of the rear wheel brake 33 is activated, and if the antilock brake control of the rear wheel brake 33 is activated, the braking of the front wheel 2 starts.

Here, for example, if the antilock brake control is activated to operate the front wheel brake 32 prior to the rear wheel brake 33 in a state where there are not any brake operations by the occupant, the front of the motorcycle 1 sinks downward to easily cause the pitching in the vehicle front-back direction (nose dive), which easily leads to occupant's unintended posture disturbance.

On the other hand, in the first embodiment of the present invention, first, the rear wheel brake 33 is only operated to generate the braking force of the rear wheel 3, and hence the pitching of the motorcycle 1 is inhibited from being caused. Furthermore, a sense of deceleration can be given to notify the occupant of the deceleration, and the disturbance in occupant's posture can be inhibited.

Furthermore, in the step S4, simultaneously with the braking start of the rear wheel brake 33, the pressure of the front wheel brake 32 preliminarily rises to the predetermined pressure P, and hence in the step S6, the braking force can rapidly act on the front wheel brake 32, to rapidly decelerate the motorcycle 1.

With reference to FIG. 6, in the step S6 and the step S7, at time t2, the antilock brake control of the rear wheel 3 is activated, and the front wheel brake 32 at the predetermined pressure P starts to be pressurized. Upon the activation of the antilock brake control, the hydraulic pressure of the rear wheel brake 33 is maintained almost constant.

With reference to FIG. 7, in the step S6 and the step S7, the antilock brake control of the rear wheel 3 is activated at the rear wheel braking limit point B on the vertical axis. The automatic brake controller 55 also operates the front wheel brake 32 so that the braking force follows the rear wheel brake boundary C (see arrow Y2 in FIG. 7). That is, in the step S6 and the step S7, the braking of the front wheel brake 32 is performed while maintaining a lock limit operation state of the rear wheel brake 33 by the antilock brake control.

When the braking force of the front wheel 2 is generated by the operation of the front wheel brake 32, due to the front-back pitching of the motorcycle 1, a part of the load on the motorcycle 1 to the road surface moves from a rear wheel 3 side to a front wheel 2 side, and the braking force of the rear wheel brake 33 at the lock limit decreases. Consequently, a limit braking force of the rear wheel brake 33 gradually decreases along the rear wheel brake boundary C as the braking force of the front wheel brake 32 increases, but a braking force of the whole motorcycle 1 increases that is obtained by adding up the braking forces of the front wheel brake 32 and rear wheel brake 33.

Subsequently, with reference to FIG. 5, the automatic brake controller 55 determines whether the deceleration obtained by the braking of each of the front wheel brake 32 and the rear wheel brake 33 used together in the step S7 reaches the target deceleration T (FIG. 4) (step S8).

If the deceleration does not reach the target deceleration T (the step S8: No), the processing returns to the step S7 where the automatic brake controller 55 further pressurizes the front wheel brake 32.

If the deceleration reaches the target deceleration T (the step S8: Yes), the automatic brake controller 55 controls the hydraulic pressures of the front wheel brake 32 and the rear wheel brake 33 to maintain the deceleration (step S9), and determines whether the motorcycle 1 stops (step S10).

With reference to FIG. 6, in the step S8, the antilock brake control of the front wheel brake 32 is activated at time t3. Upon the activation of the antilock brake control, the hydraulic pressure of the front wheel brake 32 is maintained almost constant. The target deceleration T in the step S8 corresponds to the deceleration at which the antilock brake control of the front wheel brake 32 is activated.

With reference to FIG. 7, in the step S8, the automatic brake controller 55 increases the braking forces of the front wheel brake 32 and the rear wheel brake 33 to such an extent that the occupant's posture is not noticeably disturbed by the deceleration. This braking force is maintained in the step S9.

With reference to FIG. 5, if the motorcycle 1 stops (the step S10: Yes), the control unit 31 ends the processing of the automatic brake control.

If the motorcycle 1 does not stop (the step S10: No), the control unit 31 determines whether there is the possibility of collision of the motorcycle 1 with the obstacle ahead (step S11).

If there is the possibility of collision (the step S11: Yes), the control unit 31 controls the front wheel brake 32 and the rear wheel brake 33 to maintain the deceleration.

If there is no possibility of collision (the step S11: No), the control unit 31 ends the processing of the automatic brake control. That is, in case where it is determined in the step S11 that there is no possibility of collision, the control unit 31 ends the processing of the automatic brake control even if the motorcycle 1 does not stop.

Furthermore, in the step S5, if the deceleration reaches the target deceleration T (the step S5: Yes), the automatic brake controller 55 maintains the deceleration to shift to the step S10 (step S12). That is, in case where the possibility of collision can be eliminated only by the operation of the rear wheel brake 33, the braking by the front wheel brake 32 is not performed.

If there is the brake operation in the step S2 (the step S2: Yes), the control unit 31 performs a usual brake operation (step S13), to end the processing of the automatic brake control. The usual brake operation includes increasing the braking force in accordance with the operation amounts of the front brake operation element 34a and the rear brake operation element 35a. In the usual brake operation, if the lock limit point is reached, the control unit 31 performs the antilock brake control to avoid the lock of the front wheel 2 and the rear wheel 3.

Note that in case where it is determined that the possibility of collision cannot be eliminated by the usual brake operation, the control unit 31 may forcibly perform the automatic brake control starting from the step S4.

As described above, according to the first embodiment to which the present invention is applied, the brake device for the motorcycle 1 comprises the front wheel brake 32 and the rear wheel brake 33 that are hydraulic, and the first control unit 31a that controls the operations of the front wheel brake 32 and the rear wheel brake 33, the second control unit 31b comprises the collision possibility determining section 53 that determines the possibility of collision of the own vehicle with the obstacle ahead, the first control unit 31a comprises the automatic brake controller 55 that performs the automatic brake control to automatically increase the braking forces of the front wheel brake 32 and the rear wheel brake 33, and in case where the collision possibility determining section 53 determines that there is the possibility of collision, the automatic brake controller 55 pressurizes the rear wheel brake 33 to brake the rear wheel 3, and simultaneously pressurizes the front wheel brake 32 up to the predetermined pressure P at which the vehicle body posture is not changed by the braking of the front wheel 2.

According to this configuration, the rear wheel 3 is braked by the rear wheel brake 33, and simultaneously the front wheel brake 32 is pressurized up to the predetermined pressure P at which the vehicle body posture is not changed by the braking of the front wheel 2, so that when the front wheel brake 32 is further pressurized to brake the front wheel 2, the hydraulic pressure can be rapidly raised. Consequently, following the rear wheel 3, the front wheel 2 can be rapidly braked, and the motorcycle 1 can be rapidly decelerated by the automatic brake. Furthermore, since the rear wheel 3 is substantially braked prior to the front wheel 2, the front-back pitching of the motorcycle 1 can reduce, and the operation of the automatic brake is hard to affect an occupant's posture.

Furthermore, the first control unit 31a comprises the brake controller 56 that adjusts the pressure of the rear wheel brake 33 to avoid the lock of the rear wheel 3, and the automatic brake controller 55 pressurizes the front wheel brake 32 at the predetermined pressure P to brake the front wheel 2, when an antilock operation by the brake controller 56 is activated. According to this configuration, the braking force of the rear wheel 3 can be utilized to a maximum degree, and hence the front-back pitching of the motorcycle 1 can effectively reduce.

Additionally, in the above first embodiment, the first control unit 31a and the second control unit 31b are integrally provided, but the first control unit 31a and the second control unit 31b may be provided separately. In this case, the first control unit 31a and the second control unit 31b can be arranged individually, and a degree of freedom in arrangement is high.

Second Embodiment

Hereinafter, description will be made as to a second embodiment to which the present invention is applied with reference to FIG. 8 to FIG. 10. In this second embodiment, a part configured in the same manner as in the above first embodiment is denoted with the same reference sign, and description thereof is omitted.

The second embodiment of the present invention is different from the above first embodiment in that automatic brake control is performed in accordance with a bank angle of a motorcycle 1.

Figure 8:
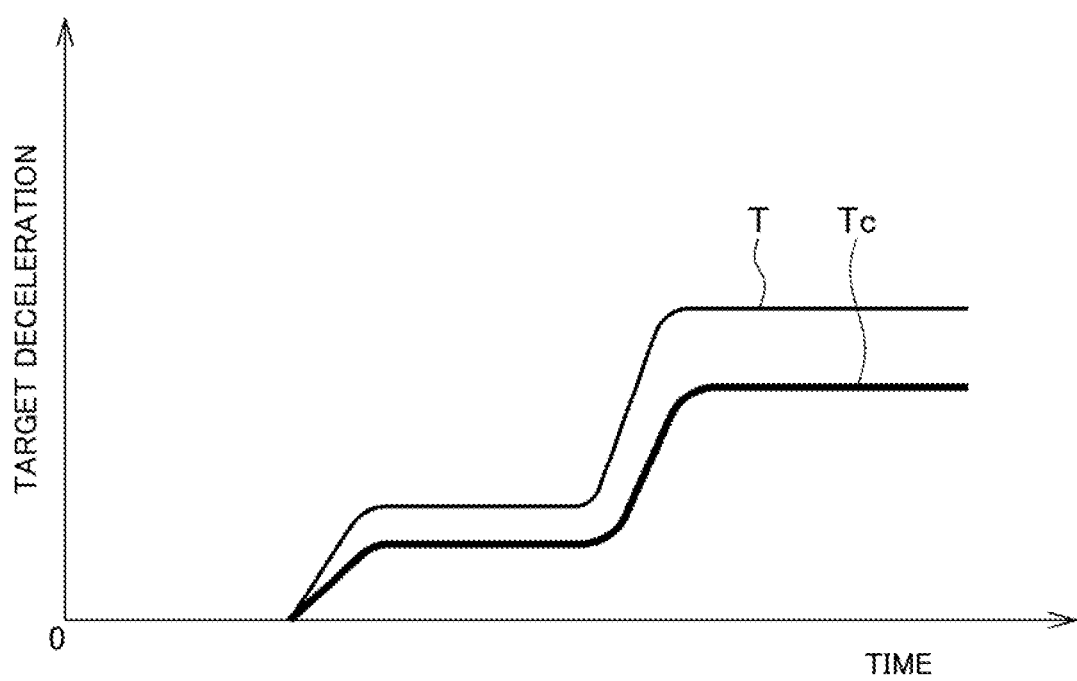
FIG. 8 is a graph showing a target deceleration in a second embodiment.

FIG. 8 is a graph showing a target deceleration in the second embodiment.

In the second embodiment, the target deceleration of the automatic brake control is changed in accordance with the bank angle in case where the motorcycle 1 turns right and left.

FIG. 8 shows a target deceleration T in an upright state (a bank angle of 0°) of the motorcycle 1, and a target deceleration Tc in case where the motorcycle 1 banks at a predetermined bank angle θ1 or more in a right-left direction.

Figure 9:
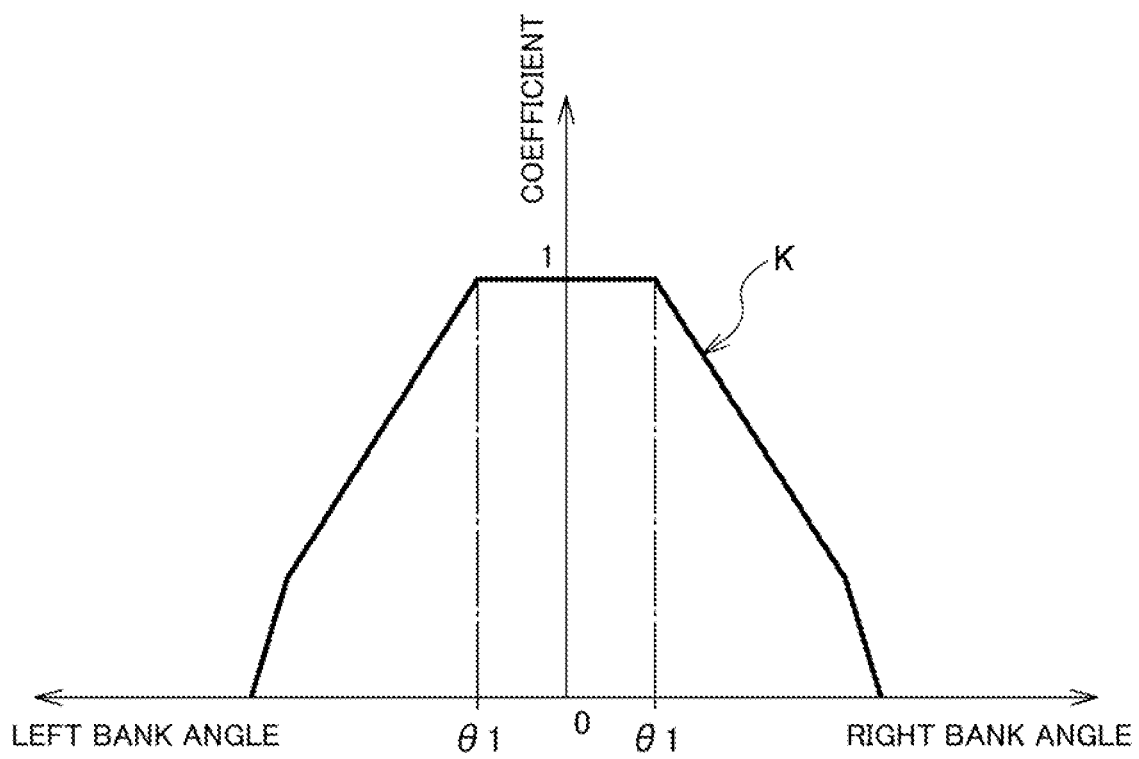
FIG. 9 is a graph showing a coefficient in changing a target deceleration.

FIG. 9 is a graph showing a coefficient in changing the target deceleration.

The target deceleration Tc is determined by multiplying the target deceleration T in the upright state of the motorcycle 1 by a coefficient K.

A value of the coefficient K is 1 from the bank angle of 0° to the predetermined bank angle θ1. If the bank angle is larger than the predetermined bank angle θ1, the value of the coefficient K is smaller than 1, and decreases for a short time in accordance with the increase of the bank angle.

That is, if the bank angle increases, the target deceleration of the automatic brake control is smaller than the target deceleration T in the upright state of the motorcycle 1, and the motorcycle 1 is moderately decelerated. A change in coefficient to the bank angle is the same in a right-left bank direction.

If the target deceleration decreases, a hydraulic pressure to be applied to each of a front wheel brake 32 and a rear wheel brake 33 also decreases in the automatic brake control.

Figure 10:
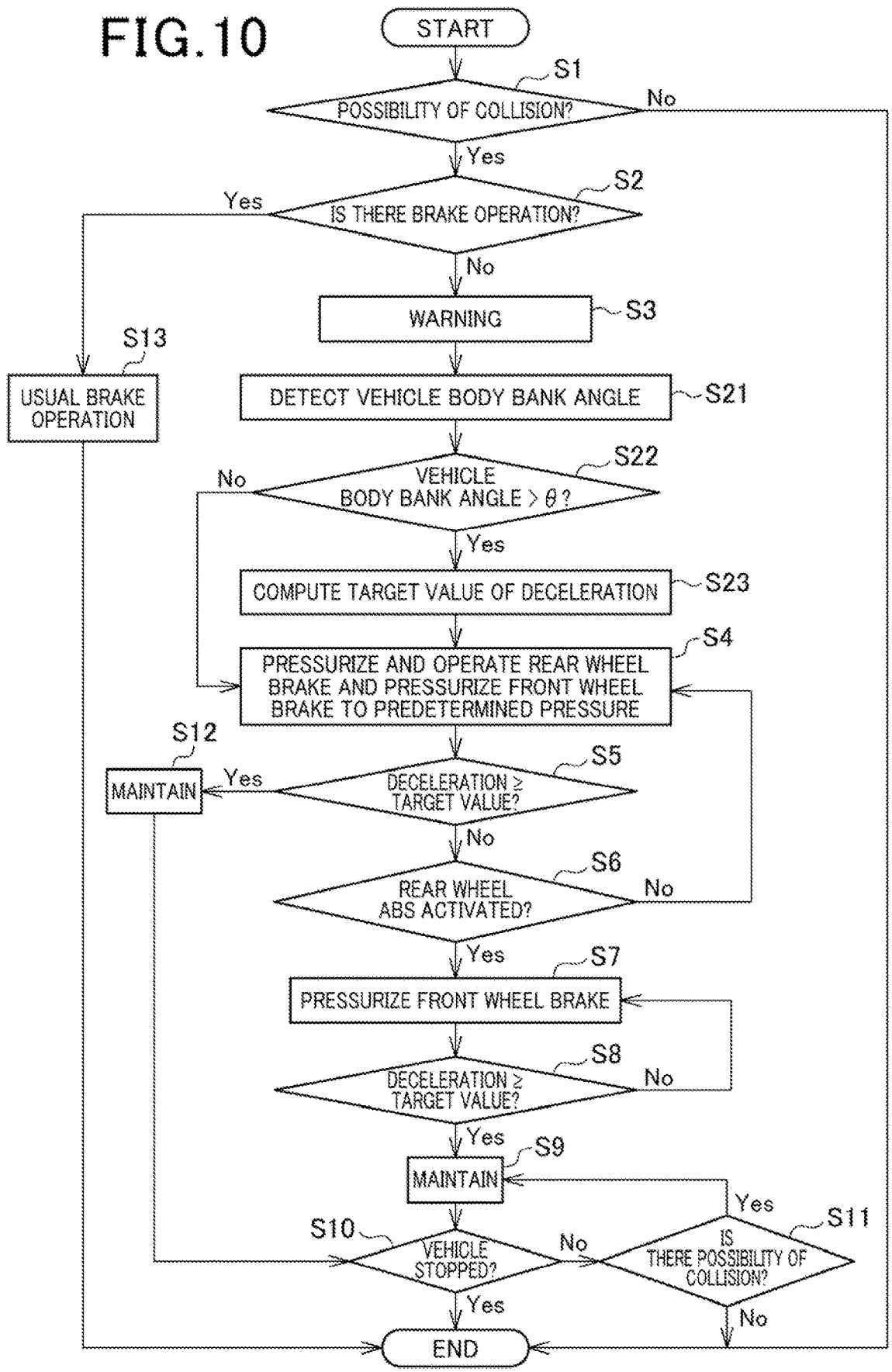
FIG. 10 is a flowchart showing processing of automatic brake control of the second embodiment.

FIG. 10 is a flowchart showing processing of the automatic brake control of the second embodiment.

The flowchart of FIG. 10 is formed by changing a part of the flowchart of FIG. 5 of the first embodiment, the same processing as in FIG. 5 is denoted with the same reference signs, and detailed description thereof is omitted.

In the second embodiment, after warning in step S3, a second control unit 31b acquires the bank angle via a bank angle detector 50 (step S21).

Next, the second control unit 31b determines whether the bank angle of the step S21 is larger than the predetermined bank angle θ1 (step S22).

If the bank angle is less than or equal to the predetermined bank angle θ1 (the step S22: No), a first control unit 31a shifts to processing of step S4. In this case, in step S5 and step S8, an automatic brake controller 55 uses the target deceleration T as a target value of deceleration of the motorcycle 1, to control the front wheel brake 32 and the rear wheel brake 33.

If the bank angle is larger than the predetermined bank angle θ1 (the step S22: Yes), the first control unit 31a calculates the target deceleration Tc that is a correction value of the target deceleration by use of the coefficient K (step S23), and shifts to the processing of the step S4. In this case, in the step S5 and the step S8, the automatic brake controller 55 uses the corrected target deceleration Tc as the target value of the deceleration of the motorcycle 1, to control the front wheel brake 32 and the rear wheel brake 33.

As described above, according to the second embodiment to which the present invention is applied, the automatic brake controller 55 operates the rear wheel brake 33 and the front wheel brake 32 so that the deceleration of the own vehicle reaches the target deceleration T, and the automatic brake controller 55 decreases the target deceleration T to the target deceleration Tc in case where the bank angle of the own vehicle is larger than the predetermined bank angle θ1. According to this configuration, in case where the bank angle is larger than the predetermined bank angle θ1, the deceleration decreases, and hence the deceleration by the automatic brake during turning and banking of the motorcycle 1 can be more moderate than in a usual upright state of the motorcycle 1. Consequently, the operation of the automatic brake is hard to affect an occupant's posture. Note that the automatic brake controller 55 just needs to operate at least one of the rear wheel brake 33 and the front wheel brake 32.

Third Embodiment

Hereinafter, description will be made as to a third embodiment to which the present invention is applied with reference to FIG. 11 and others. In this third embodiment, a part configured in the same manner as in the above first embodiment is denoted with the same reference sign, and description thereof is omitted.

The third embodiment of the present invention is different from the above first embodiment, for example, in that during automatic brake control, operating characteristics of front forks 21 and a rear suspension 19 are changed.

In a front suspension automatic adjustment mechanism 46 (FIG. 2) of the front forks 21, an amount of a fork spring to be compressed can be changed by an actuator such as a motor to be driven by a second control unit 31b.

Furthermore, in the front suspension automatic adjustment mechanism 46, the actuator, such as the motor to be driven by the second control unit 31b, operates a front side damping force adjusting section, so that a damping force in a compressing direction and an elongation direction of each of the front forks 21 can be changed.

The rear suspension 19 shown in FIG. 1 comprises a tube 19a that makes a stroke in an axial direction, a spring 19b to be compressed in the axial direction, hydraulic oil, and a rear side damping force adjusting section (not shown) that can adjust a damping force in the stroke of the tube 19a.

In a rear suspension automatic adjustment mechanism (FIG. 2), the actuator, such as the motor to be driven by the second control unit 31b, can change the amount of the spring 19b to be compressed.

Furthermore, in the rear suspension automatic adjustment mechanism 47, the actuator, such as the motor to be driven by the second control unit 31b, operates the above rear side damping force adjusting section, so that a damping force in a compressing direction and an elongation direction of the tube 19a can be changed.

Figure 11:
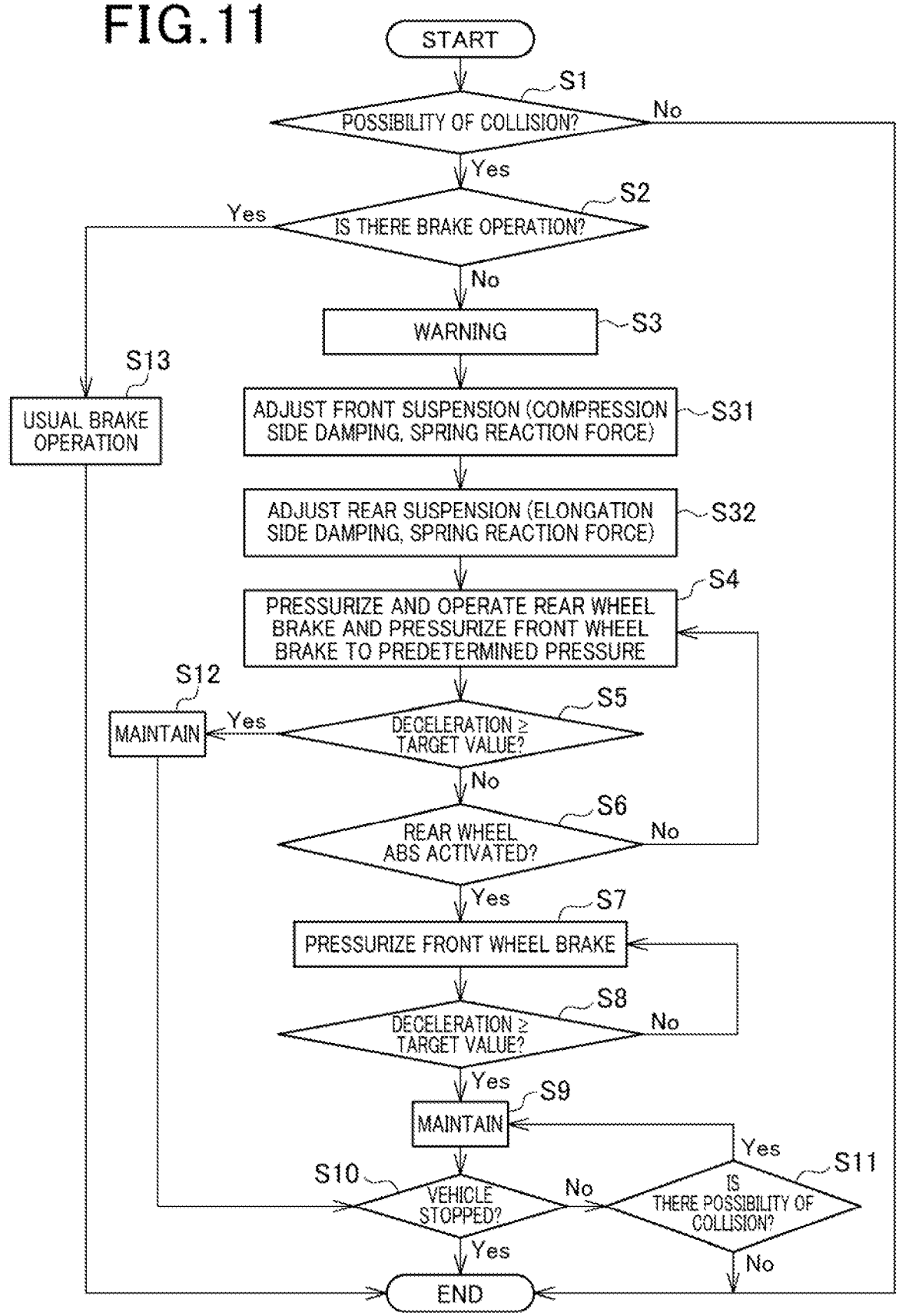
FIG. 11 is a flowchart showing processing of automatic brake control of a third embodiment.

FIG. 11 is a flowchart showing processing of automatic brake control of the third embodiment.

The flowchart of FIG. 11 is formed by changing a part of the flowchart of FIG. 5 of the first embodiment, the same processing as in FIG. 5 is denoted with the same reference signs, and detailed description thereof is omitted.

In the third embodiment, after warning in step S3, the second control unit 31b drives and controls the front suspension automatic adjustment mechanism 46, to increase a damping force of each of the front forks 21 in the compressing direction, and the above fork spring is further compressed to increase a reaction force of the fork spring (step S31). Consequently, the front fork 21 is hard to operate to the stroke in the compressing direction, and a front of a motorcycle 1 is inhibited from being in a downward posture.

Next, the second control unit 31b drives and controls the rear suspension automatic adjustment mechanism 47 to increase the damping force of the rear suspension 19 in the elongation direction and to decrease the amount of the spring 19b to be compressed and the reaction force of the spring 19b (step S32). Consequently, the rear suspension 19 is hard to operate to the stroke in the elongation direction, and the front of the motorcycle 1 is inhibited from being in the downward posture. Note that the control unit 31 may simultaneously execute the step S31 and the step S32.

Subsequently, a first control unit 31a shifts to processing of step S4, and starts braking by automatic brakes of a front wheel brake 32 and a rear wheel brake 33.

As described above, according to the third embodiment to which the present invention is applied, the motorcycle 1 comprises the front suspension automatic adjustment mechanism 46 that adjusts characteristics of the front forks 21 for a front wheel 2, and in case where a collision possibility determining section 53 determines that there is the possibility of collision, the second control unit 31b performs, via the front suspension automatic adjustment mechanism 46, at least one of control of increase of the damping force of each of the front forks 21 in the compressing direction and control of increase of the spring reaction force of the front fork 21. According to this configuration, by the increase of the damping force of the front fork 21 in the compressing direction and the increase of the spring reaction force, it is possible to reduce displacement of the front fork 21 in the compressing direction during the braking by automatic brake control. Consequently, front-back pitching of the motorcycle 1 can reduce, and the operation of the automatic brake is hard to affect an occupant's posture.

Note that the second control unit 31b may only perform at least one of the control of the increase of the damping force of the front fork 21 in the compressing direction and the control of the increase of the spring reaction force of the front fork 21.

Furthermore, the motorcycle 1 comprises the rear suspension automatic adjustment mechanism 47 that adjusts a characteristic of the rear suspension 19 for a rear wheel 3, and in case where the collision possibility determining section 53 determines that there is the possibility of collision, the second control unit 31b performs, via the rear suspension automatic adjustment mechanism 47, control of increase of the damping force of the rear suspension 19 in the elongation direction and control of decrease of the spring reaction force of the rear suspension 19. According to this configuration, by the increase of the damping force of the rear suspension 19 in the elongation direction and the decrease of the spring reaction force, it is possible to reduce displacement of the rear suspension 19 in the elongation direction during the braking by the automatic brake control. Consequently, the front-back pitching of the motorcycle 1 can reduce, and the operation of the automatic brake is hard to affect the occupant's posture.

Note that the second control unit 31b may only perform at least one of the control of the increase of the damping force of the rear suspension 19 in the elongation direction and the control of the decrease of the spring reaction force of the rear suspension 19.

Furthermore, the occupant can recognize that the automatic brake is operated due to the change in the posture of the motorcycle 1 by the operations of the front suspension automatic adjustment mechanism 46 and the rear suspension automatic adjustment mechanism 47 prior to the braking start by the automatic brake.

Fourth Embodiment

Hereinafter, description will be made as to a fourth embodiment to which the present invention is applied with reference to FIG. 12, FIG. 13 and others. In this fourth embodiment, a part configured in the same manner as in the above first embodiment is denoted with the same reference sign, and description thereof is omitted.

The fourth embodiment of the present invention is different from the above first embodiment, for example, in that automatic brake control is changed in accordance with an inclination of a road surface.

Figure 12:
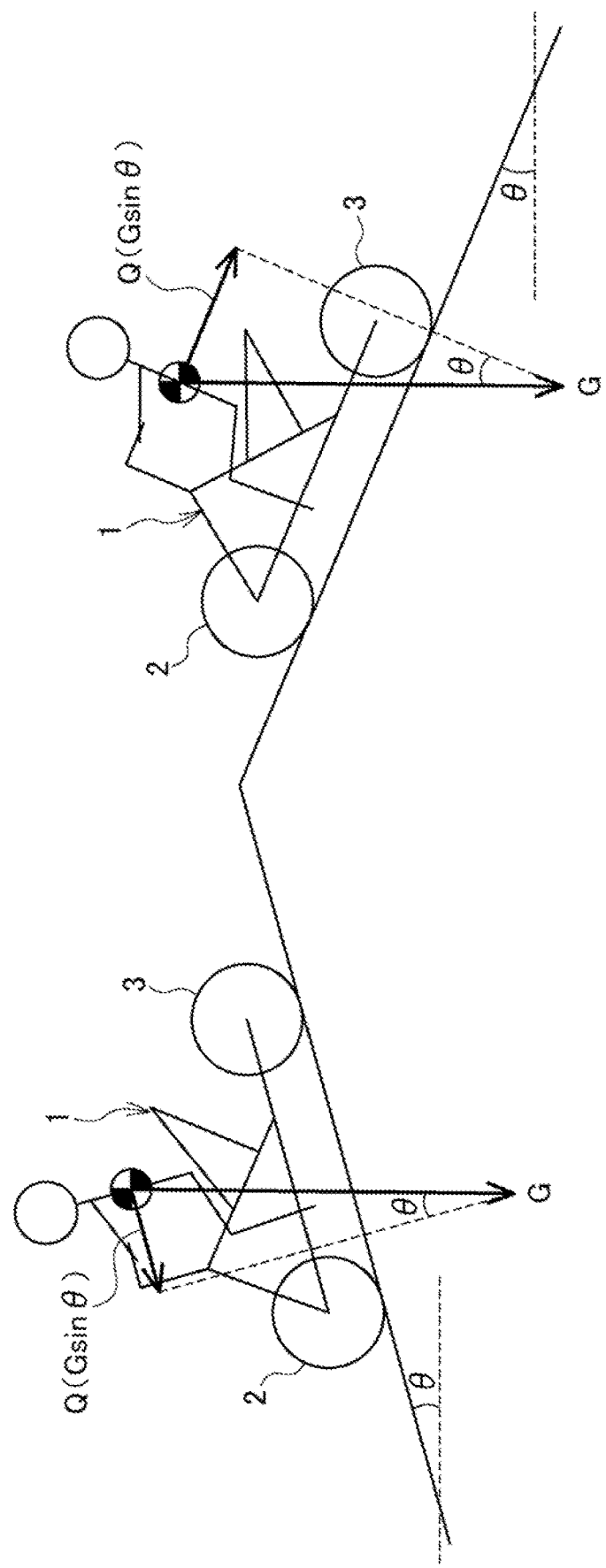
FIG. 12 is a schematic view showing a force that acts on an occupant of a motorcycle 1 in a slope.

FIG. 12 is a schematic view showing a force that acts on an occupant of a motorcycle 1 in a slope.

In case where θ° is an inclination angle of the road surface, G is gravity, and a travel direction of the motorcycle 1 traveling forward is a positive direction of a force, a force Q that acts on a center of gravity in the occupant of the motorcycle 1 along a downward slope is obtained by Equation (1) described below.

$$Q = G \times \sin\theta \qquad (1)$$

That is, along the downward slope, the occupant is pulled downward and forward by the force Q. The force Q is zero on level ground with an inclination angle of 0°, and increases as the inclination angle increases.

Furthermore, along an upward slope, the force Q acts in a reverse direction to its direction along the downward slope, and acts in a negative direction. That is, along the upward slope, the occupant is pulled downward and rearward by the force Q.

A target deceleration T of the automatic brake control is calculated, for example, by Equation (2) described below, in which DG is a deceleration for the occupant to withstand on the level ground with the inclination angle of 0°. The deceleration DG is, for example, from 40 to 50% of a gravitational acceleration.

$$T = DG - Q \qquad (2)$$

That is, the target deceleration T is DG on the level ground, and DG−Q on the downward slope where since the force Q is subtracted, the target deceleration is smaller than that of the level ground.

Furthermore, along the upward slope, the target deceleration T is DG+Q because Q is a negative value, and the target deceleration is larger than that of the level ground because the force Q is added.

Figure 13:
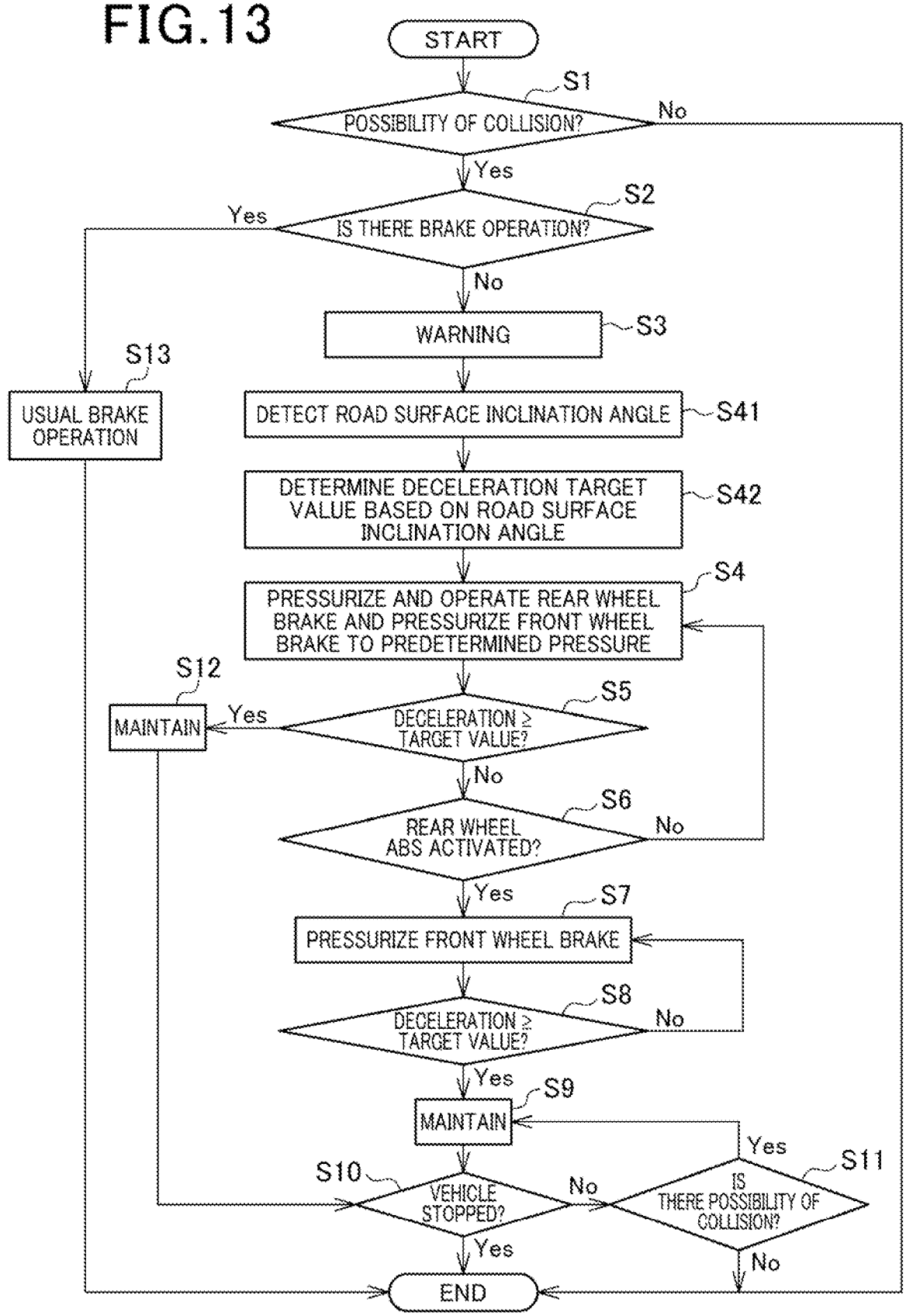
FIG. 13 is a flowchart showing processing of automatic brake control of a fourth embodiment.

FIG. 13 is a flowchart showing processing of the automatic brake control of the fourth embodiment.

The flowchart of FIG. 13 is formed by changing a part of the flowchart of FIG. 5 of the first embodiment, the same processing as in FIG. 5 is denoted with the same reference signs, and detailed description thereof is omitted.

In the fourth embodiment, after warning in step S3, a second control unit 31b acquires, from a road surface inclination angle detector 51, the inclination of the road surface where the motorcycle 1 travels (step S41).

Next, a first control unit 31a calculates the target deceleration T by Equation (2) described above (step S42), and shifts to processing of step S4. The target deceleration T of the downward slope is smaller than that of the level ground, and the target deceleration of the upward slope is larger than that of the level ground.

In step S5 and step S8, an automatic brake controller 55 uses the target deceleration T set in accordance with the inclination of the road surface in the step S42 as a target value of the deceleration of the motorcycle 1, to control a front wheel brake 32 and a rear wheel brake 33.

As described above, according to the fourth embodiment to which the present invention is applied, the brake device comprises the road surface inclination angle detector 51 that detects the inclination of the road surface, the automatic brake controller 55 operates the rear wheel brake 33 so that the deceleration of the own vehicle reaches the target deceleration T, and the automatic brake controller 55 decreases the target deceleration T in case where the road surface is the downward slope. According to this configuration, the deceleration decreases along the downward slope, and hence the operation of the automatic brake is hard to affect an occupant's posture even along the downward slope where the occupant is easily pulled forward by gravity.

Additionally, the automatic brake controller 55 increases the target deceleration T in case where the road surface is the upward slope. The occupant is pulled rearward by gravity along the upward slope, and hence if the deceleration increases, a change in forward posture of the occupant can decrease. Consequently, the motorcycle 1 can rapidly decelerate, while suppressing the change in the occupant's posture.

Note that the above embodiments merely illustrate an aspect to which the present invention is applied, and the present invention is not limited to the above embodiments.

In the above embodiments, the motorcycle 1 has been described as the example of the saddle-type vehicle, but the present invention is not limited to this example, and the present invention is applicable to another saddle-type vehicle such as a saddle-type vehicle with three wheels including two front or rear wheels or a saddle-type vehicle including four or more wheels.

REFERENCE SIGNS LIST 1 motorcycle (a saddle-type vehicle)
2 front wheel
3 rear wheel
19 rear suspension
21 front fork (a front suspension)
31a first control unit
31b second control unit
32 front wheel brake 33 rear wheel brake
46 front suspension automatic adjustment mechanism
47 rear suspension automatic adjustment mechanism
51 road surface inclination angle detector
53 collision possibility determining section
55 automatic brake controller
56 brake controller (an antilock brake controller)
P predetermined pressure
T target deceleration (a target value)
$\theta 1$ predetermined bank angle

The invention claimed is:

1. A brake device for a saddle-type vehicle, comprising a front wheel brake and a rear wheel brake that are hydraulic, and a processor including a first control unit that controls operations of the front wheel brake and the rear wheel brake and a second control unit, wherein the second control unit comprises a collision possibility determining section that determines a possibility of collision of an own vehicle with an obstacle ahead, the first control unit comprises an automatic brake controller that performs automatic brake control to automatically increase braking forces of the front wheel brake and the rear wheel brake, the first control unit comprises an antilock brake controller that adjusts a pressure of the rear wheel brake to avoid lock of a rear wheel, in a case where the collision possibility determining section determines that there is the possibility of collision, the automatic brake controller pressurizes the rear wheel brake to brake the rear wheel, and simultaneously pressurizes the front wheel brake up to a predetermined pressure at which a vehicle body posture is not changed by braking of a front wheel in the automatic brake control, the automatic brake controller determines whether an antilock operation by the antilock brake controller is activated, the automatic brake controller further pressurizes the rear wheel brake and maintains the front wheel brake at the predetermined pressure in the automatic brake control, when the antilock operation by the antilock brake controller is not activated, and the automatic brake controller further pressurizes the front wheel brake of the predetermined pressure to brake the front wheel in the automatic brake control, when the antilock operation by the antilock brake controller is activated.

2. The brake device for the saddle-type vehicle according to claim 1, wherein the automatic brake controller operates at least one of the rear wheel brake or the front wheel brake so that a deceleration of the own vehicle reaches a target value, and the automatic brake controller decreases the target value in case where a bank angle of the own vehicle is larger than a predetermined bank angle.

3. The brake device for the saddle-type vehicle according to claim 1, the saddle-type vehicle comprising a front suspension automatic adjustment mechanism that adjusts a characteristic of a front suspension for the front wheel, wherein in case where the collision possibility determining section determines that there is the possibility of collision, the second control unit performs, via the front suspension automatic adjustment mechanism, at least one of control of increase of a damping force of the front suspension in a compressing direction or control of increase of a spring reaction force of the front suspension.

4. The brake device for the saddle-type vehicle according to claim 1, the saddle-type vehicle comprising a rear suspension automatic adjustment mechanism that adjusts a characteristic of a rear suspension for the rear wheel, wherein in case where the collision possibility determining section determines that there is the possibility of collision, the second control unit performs, via the rear suspension automatic adjustment mechanism, at least one of control of increase of a damping force of the rear suspension in an elongation direction or control of decrease of a spring reaction force of the rear suspension.

5. The brake device for the saddle-type vehicle according to claim 1, wherein the processor comprises a road surface inclination angle detector that detects an inclination of a road surface, wherein the automatic brake controller operates the rear wheel brake so that a deceleration of the own vehicle reaches the target value, and the automatic brake controller decreases the target value in case where the road surface is a downward slope.

6. The brake device for the saddle-type vehicle according to claim 5, wherein the automatic brake controller increases the target value in case where the road surface is an upward slope.

7. The brake device for the saddle-type vehicle according to claim 1, wherein the first control unit and the second control unit are provided separately.

8. The brake device for the saddle-type vehicle according to claim 3, the saddle-type vehicle comprising a rear suspension automatic adjustment mechanism that adjusts a characteristic of a rear suspension for the rear wheel, wherein in case where the collision possibility determining section determines that there is the possibility of collision, the second control unit performs, via the rear suspension automatic adjustment mechanism, at least one of control of increase of a damping force of the rear suspension in an elongation direction or control of decrease of a spring reaction force of the rear suspension.

9. The brake device for the saddle-type vehicle according to claim 2, wherein the first control unit and the second control unit are provided separately.

10. The brake device for the saddle-type vehicle according to claim 3, wherein the first control unit and the second control unit are provided separately.

11. The brake device for the saddle-type vehicle according to claim 4, wherein the first control unit and the second control unit are provided separately.

12. The brake device for the saddle-type vehicle according to claim 5, wherein the first control unit and the second control unit are provided separately.

13. The brake device for the saddle-type vehicle according to claim 6, wherein the first control unit and the second control unit are provided separately.

14. The brake device for the saddle-type vehicle according to claim 8, wherein the first control unit and the second control unit are provided separately.

* * * * *